(12) United States Patent
Murphy

(10) Patent No.: US 11,950,111 B2
(45) Date of Patent: Apr. 2, 2024

(54) UAV MODULAR REDUNDANT COMMUNICATION MODEMS

(71) Applicant: T-Mobile USA, Inc., Bellevue, WA (US)

(72) Inventor: Sean Patrick Murphy, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 286 days.

(21) Appl. No.: 17/356,378

(22) Filed: Jun. 23, 2021

(65) Prior Publication Data

US 2021/0321271 A1 Oct. 14, 2021

Related U.S. Application Data

(62) Division of application No. 16/206,770, filed on Nov. 30, 2018, now Pat. No. 11,166,175.

(51) Int. Cl.
*H04W 12/06* (2021.01)
*H04B 7/185* (2006.01)
(Continued)

(52) U.S. Cl.
CPC ........ *H04W 24/02* (2013.01); *H04B 7/18504* (2013.01); *H04W 12/069* (2021.01); *H04W 84/047* (2013.01); *H04W 88/08* (2013.01)

(58) Field of Classification Search
CPC ... H04W 12/06; H04W 12/069; H04W 24/02; H04W 88/08
See application file for complete search history.

(56) References Cited

U.S. PATENT DOCUMENTS 9,681,360 B1 * 6/2017 Salyers ................. H04W 12/64
9,948,380 B1 * 4/2018 Vos ..................... H04B 7/18506
(Continued)

FOREIGN PATENT DOCUMENTS

CN 105375957 A 3/2016
CN 107172723 A 9/2017
(Continued)

OTHER PUBLICATIONS

Canadian Patent Application No. 3,060,191, Examiner's Report dated Dec. 22, 2020, 3 pages.
(Continued)

*Primary Examiner* — Yuwen Pan
*Assistant Examiner* — Farideh Madani

(57) ABSTRACT

An unmanned aerial vehicle (UAV) network cell that uses modular communication modems may be configured to support various communication standards and communication frequency bands. An authentication request from a modular communication modem of a plurality of modular communication modems in an unmanned aerial vehicle (UAV) network cell may be received at a core network of a wireless carrier network following an installation of the modular communication modem into the UAV network cell, in response to authenticating that the modular communication modem is authorized to communicate with the core network, the modular communication modem is registered at the core network to handle communication between the UAV network cell and the core network. However, in response to determining that the modular communication modem is not authorized to communicate with the core network, the modular communication modem is disallowed from handling communication between the UAV network cell and the core network.

20 Claims, 7 Drawing Sheets

(51) Int. Cl.
*H04W 12/069* (2021.01)
*H04W 24/02* (2009.01)
*H04W 84/04* (2009.01)
*H04W 88/08* (2009.01)

(56) References Cited

U.S. PATENT DOCUMENTS

| | | |
|---|---|---|
| 2004/0113756 A1 | 6/2004 | Mollenkopf |
| 2005/0135476 A1 | 6/2005 | Gentric et al. |
| 2010/0113055 A1 | 5/2010 | Iwamura et al. |
| 2013/0242964 A1 | 9/2013 | Hassan et al. |
| 2016/0300495 A1 | 10/2016 | Kantor et al. |
| 2017/0086096 A1* | 3/2017 | Chakra ............. H04W 28/0289 |
| 2017/0150373 A1 | 5/2017 | Brennan et al. |
| 2017/0339706 A1 | 11/2017 | Andreoli-Fang et al. |
| 2018/0097560 A1 | 4/2018 | Jalali |
| 2018/0102831 A1 | 4/2018 | Murphy |
| 2019/0289613 A1 | 9/2019 | Fanelli et al. |
| 2020/0252838 A1 | 8/2020 | Akdeniz et al. |
| 2020/0383029 A1* | 12/2020 | Takeda ............ H04W 36/00837 |

FOREIGN PATENT DOCUMENTS

| | | |
|---|---|---|
| CN | 107734604 A | 2/2018 |
| CN | 108353290 A | 7/2018 |
| EP | 3188477 A1 | 7/2017 |
| WO | 2018203120 A1 | 11/2018 |

OTHER PUBLICATIONS

Chinese Patent Application No. 201911183703.1, Office Action dated May 27, 2021, 8 pages.
European Patent Application No. 19208626.2, Extended European Search Report dated Jul. 14, 2020, 11 pages.
European Patent Application No. 19208626.2, Partial European Search Report dated Apr. 17, 2020, 10 pages.
U.S. Appl. No. 16/206,770, Final Office Action dated Aug. 26, 2020, 56 pages.
U.S. Appl. No. 16/206,770, Notice of Allowance dated Mar. 31, 2021, 37 pages.
U.S. Appl. No. 16/206,770, Office Action dated Mar. 5, 2020, 37 pages.
U.S. Appl. No. 16/206,770, Restriction Requirement, dated Nov. 1, 2019, 8 pages.
Canadian Patent Application No. 3,060,191, Examiner's Report dated Sep. 3, 2021, 3 pages.

* cited by examiner

UAV MODULAR REDUNDANT COMMUNICATION MODEMS

CROSS REFERENCE TO RELATED PATENT APPLICATION

This patent application is a divisional application of U.S. patent application Ser. No. 16/206,770, filed on Nov. 30, 2018, entitled "UAV Modular Redundant Communications," which is hereby incorporated by reference in its entirety.

BACKGROUND

Wireless communication devices are integral to the daily lives of most users. Wireless communication devices are used to make voice calls, check emails and text messages, update social media pages, stream media, browse websites, and so forth. As a result, users of wireless communication devices expect wireless telecommunication carriers to provide constant and reliable wireless communication service at all times.

In some instances, wireless communication services may become disrupted due to natural or human-originated events. For example, a natural disaster may knock out power or communication cables to ground network cells in a geographical area. In another example, a celebratory event or sporting event may result in an exceptionally large number of users that overwhelm ground network cells and prevent the ground network cells from providing adequate wireless communication services. In such instances, a wireless telecommunication carrier may deploy a ground wireless communication support vehicle to the affected geographical area to provide wireless communication coverage.

However, in some scenarios, the deployment of a ground wireless communication support vehicle may be hampered by natural terrain features and/or artificial obstacles. For example, steep hills or the lack of passable roadways may prevent a ground wireless communication support vehicle from reaching an affected geographical area to provide supplemental wireless communication services. The lack of the supplemental wireless communication services may disrupt the ability of first responders to respond to emergency events and coordinate emergency service efforts, as well as prevent the general public from carrying out normal wireless communication during events. Accordingly, some wireless telecommunication carriers may deploy an unmanned aerial vehicle (UAV) network cell to provide wireless communication coverage.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
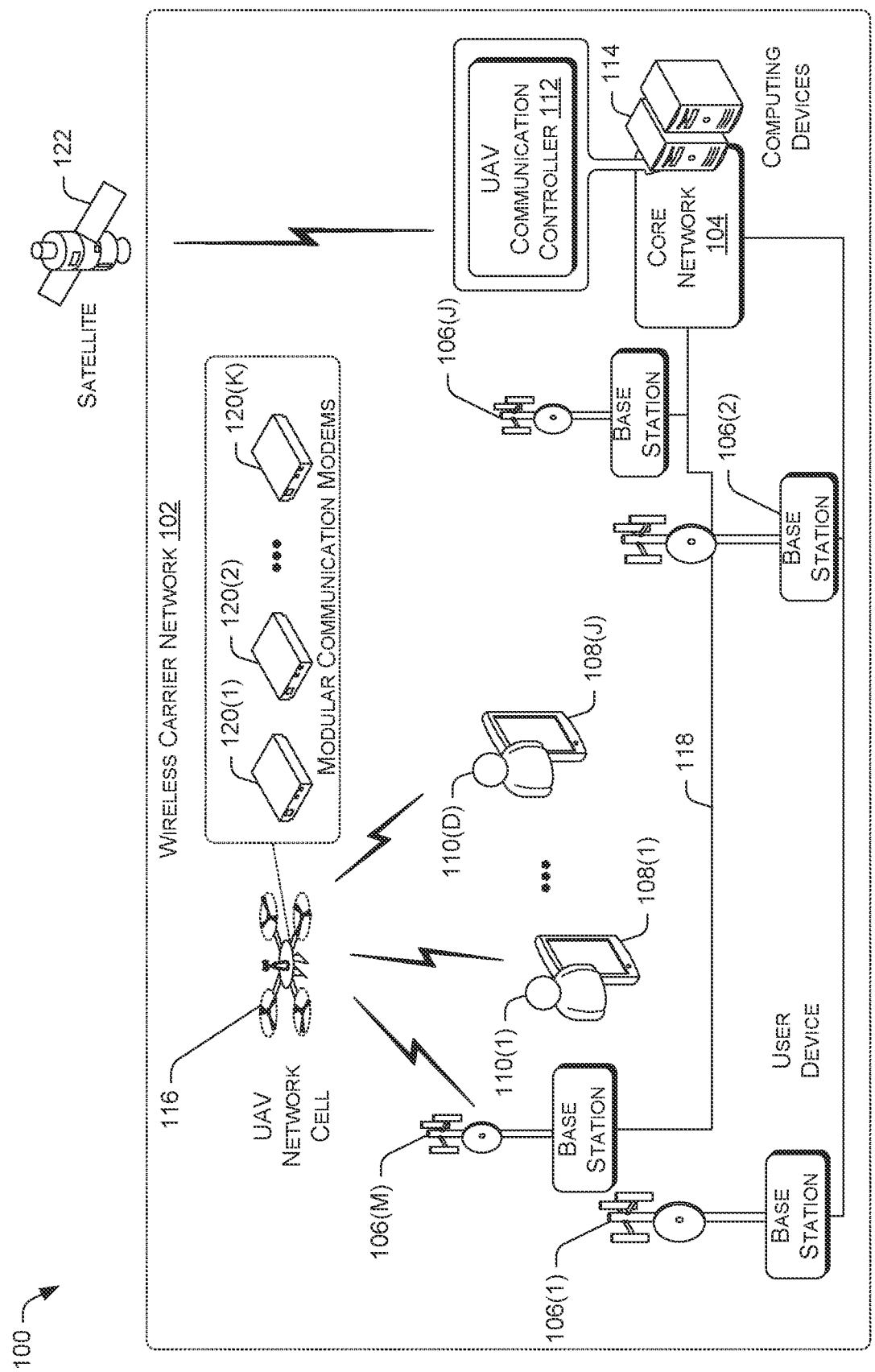
FIG. 1 illustrates an example environment for a wireless carrier network to use modular UAV communication components to provide wireless communication coverage.

This disclosure is directed to an unmanned aerial vehicle (UAV) network cell that is equipped with modular communication hardware components. The modular communication hardware components may include modular communication modems that can be installed and removed from a system board of the UAV network cell in a plug-and-play fashion. The modular communication modems may provide wireless communication according to different communication standards, such as 3G, 4G, 5G, satellite, etc. Further, the modular communication modems may provide wireless communication according to multiple spectrum bands, in which the spectrum bands may belong to different wireless carrier networks.

A UAV network cell may be equipped with a specific set of modular communication modems by a wireless carrier network prior to the deployment of the UAV network cell to provide network coverage to subscriber user devices of the wireless carrier network. In turn, a core network of a wireless carrier network may register the modular communication modems so that the UAV network cell may use the modular communication modems to cooperatively maintain continuous communication with the core network via multiple communication frequency bands and/or communication standards.

In one scenario, a signal robustness value of frequency band that the UAV network cell is using to communicate with a ground network of a wireless carrier network cell may drop below a threshold. In such a scenario, the UAV network cell may use another communication modem to establish a new communication channel with the ground network cell or an alternative ground network cell using a different frequency band. In this way, the use of multiple modular communication modems may enable the UAV network cell to maintain continuous communication with a core network of a wireless carrier network via parallel communication channels, communication channel scaling, communication channel roaming, or communication channel hopping.

In another scenario, a quality of experience (QoE) value of a communication session that a UAV network cell is carrying for a user device may drop below a threshold due to a lack of a relay backhaul throughput on a first communication frequency band. In such a scenario, the UAV network cell may once again use another communication modem to establish a new communication channel with the ground network cell or an alternative ground network cell using a second communication frequency band. The UAV network cell may use the second communication frequency band to carry one or more communication sessions that are previously carried by the first communication frequency band. Accordingly, the second communication frequency band may be used to either replace the first communication frequency band or supplement the first communication frequency band to increase the relay backhaul throughput for carrying communication sessions of user devices.

A UAV network cell that uses modular communication modems may be configured on-the-fly to support various communication standards and communication frequency bands depending on the objectives of the UAV network cell deployment. Accordingly, such a UAV network cell offers flexible communication capabilities and the ability to accept hardware upgrades as future communication standards and technologies are released. Example implementations are provided below with reference to the following FIGS. 1-7.

Example Environment Architecture

FIG. 1 illustrates an example environment 100 for a wireless carrier network to use modular UAV communication components to provide wireless communication coverage. The environment 100 may include a wireless carrier network 102 that is operated by a wireless telecommunication carrier. The wireless carrier network 102 may include a radio access network and a core network 104. The radio access network may include multiple base stations, such as base stations 106(1)-106(J). The base stations 106(1)-106(J) are responsible for handling voice and data traffic between user devices and the core network 104. In some instances, the user devices may include smartphones, tablet computers, embedded computer systems, or any other device that is capable of using the wireless communication services that are provided by the wireless carrier network 102. For example, the user devices may include user devices 108(1)-108(J) that are used by subscribers 110(1)-110(D) of the wireless carrier network 102.

Each of the base stations 106(1)-106(J) may provide a corresponding network cell that delivers telecommunication and data communication coverage. The core network 104 may use the network cells to provide wireless communication services to user devices. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 104. Additionally, a UAV communication controller 112 may be implemented by the computing devices 114 of the core network 104.

The wireless carrier network 102 may dispatch UAV network cells to provide wireless communication coverage to geographical areas. For example, a UAV network cell 116 may be dispatched to provide wireless communication coverage for a geographical area. The geographical area may include a region in which normal ground cellular communication coverage has been disrupted or remote regions that are otherwise unequipped with ground wireless communication coverage. The normal ground wireless communication coverage may be disrupted due to natural disasters or manmade events.

Each of the UAV network cells may be a UAV in the form of a fixed-wing aircraft, a rotary wing aircraft, a rigid buoyant gas airship, a non-rigid buoyant gas airship, and/or so forth. The UAV may be equipped with a micro Evolved Node B (eNodeB) for providing wireless communication uplink and downlink to user devices. The UAV may be further equipped with a communication relay component that relays communication traffic of the user devices to a nearby ground base station. For example, the UAV network cell 116 may provide wireless communication uplink and downlink to the user devices 108(1)-108(J), while relaying any communication traffic from the user devices 108(1)-108(J) to the base station 106(M). In this way, the UAV network cell 116 may ultimately use the backhaul 118 of the base station 106(M) to route communication traffic of the user devices 108(1)-108(J) between itself and the core network 104. In other words, the base station 106(M) may act as a donor ground network cell with respect to the UAV network cell 116 for routing communication traffic to the core network 104. Accordingly, the wireless communication connection between a UAV network cell and a donor ground network cell may be referred to as a relay backhaul.

In some embodiments, the UAV network cell 116 may use a wireless in-band relay backhaul to relay communication traffic of the user devices to a ground donor network cell, such as the base station 106(M). In such instances, wireless in-band relay backhaul means the UAV network cell may use the same communication frequency band for both providing communication links to the user devices and relaying communication traffic of the user devices to the base station. The UAV network cell 116 may implement the wireless in-band relay backhaul by using some physical resource blocks of a communication frequency band for uplink/downlink with the user devices, while using other physical resource blocks of the communication frequency band for relaying communication traffic of the user devices to the base station. In other instances, the UAV network cell 116 may use multiple communication frequency bands in a multiple-input, multiple-output (MIMO) fashion, in which a set of one or more communication frequency bands is reserved for uplink/downlink communication with the user devices, while another set of one or more communication frequency bands is reserved by the UAV network cell 116 for providing a relay backhaul that relays communication traffic of the user devices to the donor ground network cell, i.e., base station 106(M).

The UAV network cell 116 may be equipped with modular communication hardware components. The modular communication hardware components may include modular communication modems 120(1)-120(K) that can be installed and removed from a system board of the UAV network cell 116 in a plug-and-play fashion. The modular communication modems 120(1)-120(K) may provide wireless communication according to different communication standards, such as 3G, 4G, 5G, satellite, etc. Further, the modular communication modems 120(1)-120(K) may provide wireless communication according to multiple spectrum bands, in which the spectrum bands may be allocated for use by different wireless carrier networks. The UAV network cell 116 may use the modular communication modems 120(1)-120(K) to relay communication between the user devices 108(1)-108(J) and a donor ground network cell, such as the base station 106(M).

In at least one embodiment, the UAV network cell 116 may be deployed with one or more of the modular communication modems 120(1)-120(K) installed. Following an installation of a modular communication modem into a system board of the UAV network cell 116, the UAV network cell 116 may load software for the communication modem to activate the modem for operation. The loading of the software for the communication modem may include installing a radio driver, a data adapter, and/or other software components that are used for the operation of the communication modem. In some instances, the loading of the software for the communication modem may further include configuring software settings for the proper operation of the communication modem. Each activated communication modem may send an authentication request to a UAV communication controller 112 of the wireless carrier network. Following authentication of a modular communication modem, the UAV communication controller 112 may register the activated communication modem. The registration information for the activated communication modem may provide service capability data on the activated communication modem. For example, the service capability data for the activated communication modem may include the one or more communication standards (e.g., 3G, 4G, 5G or satellite) that are supported by the activated communication modem. Additionally, the registration information may further include the one or more communication frequency bands that are supported by the activated communication modem, an identifier of a corresponding UAV network cell in which the modem is installed, and/or so forth. For example, a particular activated communication modem of the UAV network cell 116 may support the 4G communication standard at a first communication frequency band that is allocated to the wireless carrier network. In contrast, another activated communication modem of the UAV network cell 116 may support the 4G communication standard at a second communication frequency band that is allocated to a competitor wireless carrier network. Furthermore, an additional activated communication modem of the UAV network cell 116 may support communication with a satellite 122 for the purpose of providing a communication backhaul between the UAV network cell 116 and the core network 104. The UAV communication controller 112 of the wireless carrier network 102 may store the registration information of the activated communication modems of the UAV network cell 116 in a UAV information database.

Accordingly, the core network 104 of the wireless carrier network 102 may use the service capability data on the activated communication modems of the UAV network cell 116 to manage the relay backhaul between the UAV network cell 116 and a donor ground network cell, such as the base station 106(M). The relay backhaul may be managed to maximize a signal robustness value of the relay backhaul, maximize Quality of Experience (QoE) values for the user devices that are serviced by the UAV network cell 116, or minimize communication session drops for the user devices that are serviced by the UAV network cell 116. The management may involve using newly activated communication modems to establish additional communication channels that takeover or supplement communication channels that are already in use.

In one scenario, the UAV network cell 116 may have used a first communication modem to establish a first communication channel with the base station 106(M) on a first communication frequency band to act as a relay backhaul between the UAV network cell 116 and the base station 106(M). Subsequently, a signal robustness value of the first communication frequency band may drop below a threshold. In such a scenario, the UAV network cell 116 may use a second communication modem to establish a new communication channel with the ground network cell or an alternative ground network cell using a second communication frequency band. In various instances, the alternative ground network cell may be another ground network cell of the wireless carrier network (e.g., base station 106(3)), or a ground network cell that is operated by a different wireless carrier network. In this way, the use of multiple modular communication modems may enable the UAV network cell 116 to maintain continuous communication with a core network of a wireless carrier network.

In another scenario, a QoE value of a communication session that the UAV network cell 116 is carrying for a user device (e.g., user device 108(1)) may drop below a threshold due to a lack of a relay backhaul throughput on a first communication frequency band. The first communication frequency band may be used by the communication modem 120(1) to establish the relay backhaul between the UAV network cell 116 and a ground network cell, such as the base station 106(M). The lack of relay backhaul throughput may be due to inadequate signal strength between the UAV network cell 116 and the base station 106(M) or communication congestion resulting from too many communication sessions of user devices being carried on the first communication frequency band. In such a scenario, the UAV network cell may use communication modem 120(2) to establish a new communication channel with the ground network cell or an alternative ground network cell using a second communication frequency band. In various instances, the alternative ground network cell may be another ground network cell of the wireless carrier network (e.g., base station 106(3)), or a ground network cell that is operated by a different wireless carrier network. The UAV network cell 116 may use the second communication frequency band to carry one or more communication sessions that are previously carried by the first communication frequency band. Accordingly, the second communication frequency band may be used by the UAV network cell 116 to either replace the first communication frequency band or supplement the first communication frequency band to increase the relay backhaul throughput for carrying communication sessions of the user devices.

In some embodiments, the core network 104 may have the ability to power up or power down individual modular communication modems of the UAV network cell 116. For example, the one or more communication modems 120(1)-120(K) may be powered down to reduce the overall energy usage of the UAV network cell 116 or minimize unauthorized communication access to the UAV network cell 116.

Example UAV Network Cell Components

Figure 2:
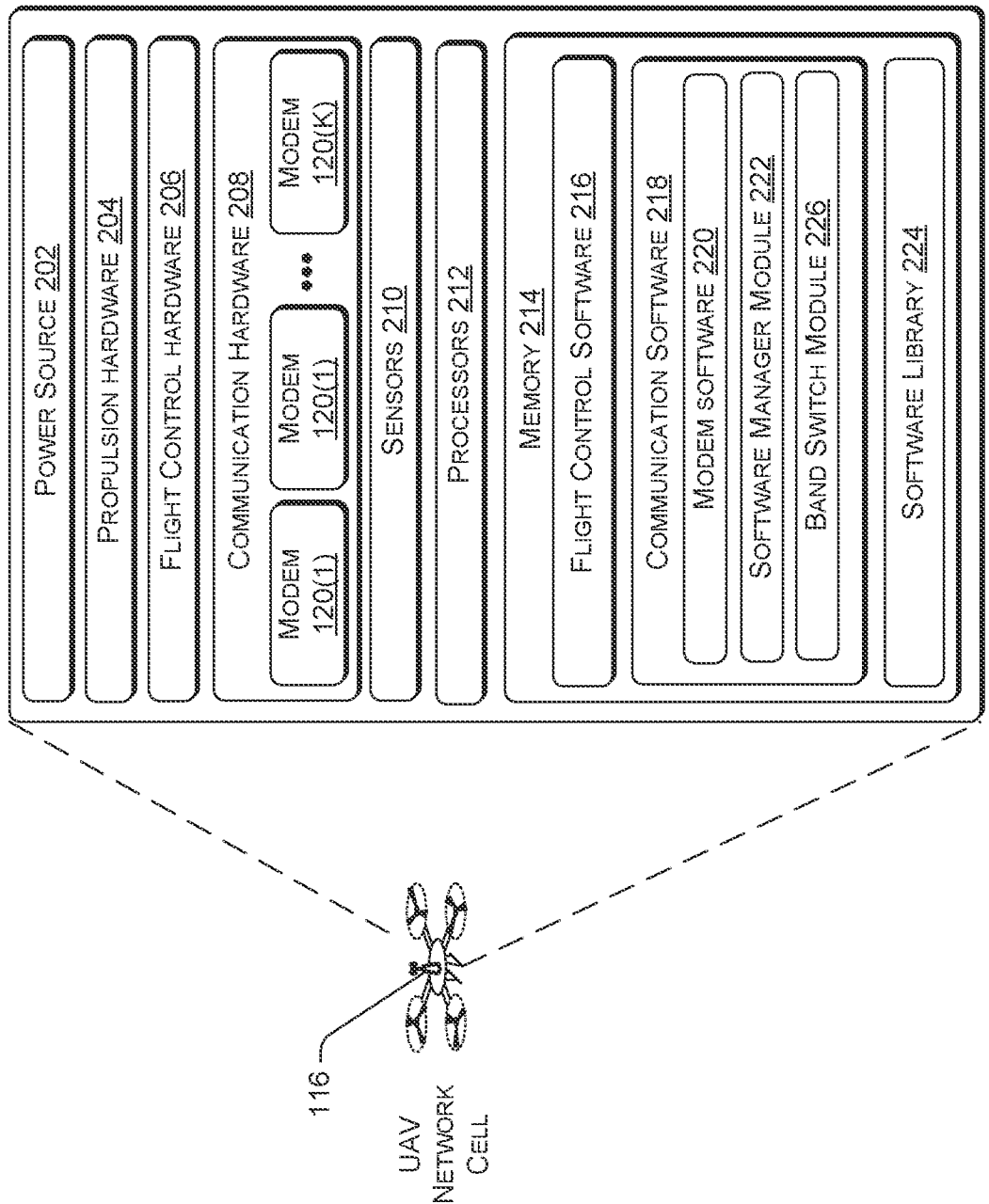
FIG. 2 is a block diagram showing various components of a UAV network cell that is configured to use modular UAV communication components to provide wireless communication coverage.

FIG. 2 is a block diagram showing various components of a UAV network cell 116 that is configured to use modular UAV communication components to provide wireless communication coverage. The UAV network cell 116 may include a power source 202, propulsion hardware 204, flight control hardware 206, communication hardware 208, sensors 210, one or more processors 212, and memory 214. The power source 202 may include electrical cells, combustible liquid fuel, combustible gas fuel, solid propellant fuel, solar panels, compressed gas, and/or other energy sources. The propulsion hardware 204 may include mechanical devices that are capable of converting the energy provided by the power source 202 into movement of the UAV network cell 116. For example, the propulsion hardware may include an internal combustion engine, an electrical motor, a jet engine, a turboprop engine, a rocket engine, propellers, rotors, and/or so forth that are mounted on the wings and/or the body of the UAV network cell 116.

The flight control hardware 206 may include actuators and control surfaces that are capable of steering the UAV network cell 116. For example, the actuators may include hydraulic actuators, gas-powered actuators, electrical actuators, and/or so forth. The actuators may move or deflect control surfaces to control the movement of the UAV network cell 116. The control surfaces may include tilt wings, rudders, slats, ailerons, elevators, trim tabs, fins, canards, and/or so forth. In some embodiments, the flight control hardware 206 may be integrated with the propulsion hardware 204. For example, such integrated hardware may include tilt rotors, variable pitch rotors, jet engines with movable thrust nozzles, and/or so forth.

The communication hardware 208 may include hardware components that enable the UAV network cell 116 to provide wireless network coverage to the user devices 108(1)-108(J). In various embodiments, the communication hardware 208 may include a system board that holds digital signal processors (DSPs), which may include single-core or multiple-core processors. The processors may perform operations in parallel to process a continuous stream of data. The communication hardware 208 may also include network processors that manage high-speed communication interfaces, including communication interfaces that interact with peripheral components. The network processors and the peripheral components may be linked by a switching fabric to enable peer-level load balancing. The communication hardware 208 may further include hardware decoders and encoders, analog-to-digital converters (ADCs), digital-to-analog converters (DACs), an antenna controller, a memory buffer, a network interface controller, signal transceivers, a subscriber identity module (SIM) card slot, a universal serial bus (USB) controller, and/or other signal processing and communication components. A SIM may be inserted into the SIM card slot or embedded on the system board to enable the UAV network cell 116 to communicate with a ground network cell. Accordingly, the communication hardware 208 may support the transmission and reception data for cellular communication, satellite communication, and/or other forms of electromagnetic energy-based communication.

The system board of the communication hardware 208 may be configured to enable the installation and removal of the modular communication modems 120(1)-120(K). Each of the modular communication modems 120(1)-120(K) may support wireless communication on a specific communication frequency band and/or according to a specific communication standard. For example, a first communication modem may support 4G communication on a first communication frequency band, while a second communication modem may support 5G communication on a second communication frequency band. In some embodiments, a communication modem may include multiple baseband processors that send and receive communication signals. In such embodiments, one or more first baseband processors of the multiple baseband processors may be configured to provide wireless communication coverage to multiple user devices. On the other hand, one or more second baseband processors of the multiple baseband processors may be configured to handle the relay backhaul between the UAV network cell 116 and a donor ground network cell. A communication modem may use the SIM to obtain communication services from the core network 104. For example, the communication modem may transmit an identifier, such as an Integrated Circuit Card Identifier (ICCID) or an International Mobile Subscriber Identity (IMSI), as contained in the SIM to the core network 104 of the wireless carrier network 102. In turn, the core network 104 may use the identifier to determine that the communication modem is authorized to receive relay backhaul communication services. The operations of the modular communication modems 120(1)-120(K) may be coordinated by a management processor that direct the activities of the modems with respect to data encoding/decoding, data buffering, data transmission, data processing, and/or so forth as the multiple modems participate in providing communication to user devices and maintaining a relay backhaul between the UAV network cell 116 and the core network 104.

The communication hardware 208 may further include one or more antennas that support the transmission and reception of data signals. The antennas may include a Yagi antenna, a horn antenna, a dish reflector antenna, a slot antenna, a waveguide antenna, a Vivaldi antenna, a helix antenna, a planar antenna, a dipole array antenna, an origami antenna, and/or other types of antenna. In some instances, an antenna may be oriented to point to a particular direction via electrical beam forming and/or via mechanical movement of one or more elements of the antenna by an antenna controller. For example, an antenna that is configured to provide cellular uplink/downlink to the user devices 108(1)-108(J) may be oriented to broadcast and receive radio signals below the body of the UAV network cell 116 in a downward facing hemispherical pattern, as the UAV network cell 116 is generally flying above the user devices 108(1)-108(J). In another example, an antenna that is configured to communicate with a donor ground network cell or a satellite may be continuously reoriented in the direction of the donor ground network cell or the satellite as the UAV network cell 116 travels along a flight path.

The sensors 210 may include a camera, a radar, a compass, an airspeed sensor, an altitude sensor, a global positioning system (GPS) sensor, control setting sensors, propulsion setting sensors, vehicle system health sensors, a transponder interrogator, and/or other sensors. The various sensors may provide operational information regarding the UAV network cell 116 that is transmitted by the communication hardware 208 to the core network 104. In some instances, the UAV network cell 116 may be further equipped with a transponder that provides vehicle identification and flight status information in response to a radio frequency interrogation.

Each of the processors 212 may be a single-core processor, a multi-core processor, a complex instruction set computing (CISC) processor, or another type of processor. The memory 214 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 212 and the memory 214 may implement flight control software 216 and communication software 218. The flight control software 216 may receive control commands from the wireless carrier network 102. In turn, the flight control software 216 may manipulate the propulsion hardware 204 and the flight control hardware 206 according to the control commands. Further, the flight control software 216 may aggregate the operational information collected by the sensors 210 for transmission to the wireless carrier network 102. In some embodiments, the flight control software 216 may include algorithms that perform automatic flight operations, such as flying to a particular location from a departure point or landing at a specific location. For example, the flight control software 216 may include a sniffer application that uses the communication hardware 208 of the UAV network cell 116 to find an active ground network cell. The sniffer application may listen for network cell signals that are transmitted by active ground network cells belonging to the wireless carrier network 102. Network cell signals broadcasted by a network cell may include a cell identifier or have signal frequency characteristics that identify the network cell as a part of the wireless carrier network 102. Accordingly, the flight control software 216 may home in on such a network cell signal and then hover or fly in a holding pattern at a predetermined distance from the network cell in order to provide wireless network coverage to a geographical area that is proximate but not covered by the network cell.

In other instances, the flight control software 216 may include an airborne collision avoidance system (ACAS) that automatically diverts the UAV network cell 116 from a flight path in response to proximity of another airborne vehicle that is sensed via radar information, image information, and/or transponder information that is obtained by the sensors 210, or in response to proximity of a terrain obstacle that is stored in an internal map database of the UAV network cell 116.

The communication software 218 may work in conjunction with the communication hardware 208 to provide cellular network coverage to user devices, as well as maintain communication with the flight path controller 312. In various embodiments, the communication software 218 may include modem software 220 that are used by each of the communication modems 120(1)-120(K) to perform communication functions. Such software may include software components that are associated with the layers in an Open Systems Interconnection model (OSI) model. Such layers may include a physical layer, a data link layer, a network layer, a transport layer, a session layer, a presentation layer, and an application layer. For example, the software components may include radio drivers, data packet schedulers, data adapters, data encoders, data decoders, antenna control software that control in-band data aggregation, data routing, data transmission, and/or data reception functions.

In some embodiments, the software for a modular communication modem may be loaded by a software manager module 222 in response to the installation of the modular communication modem on the system board of the communication hardware 208. The modular communication modem may power up following installation onto the system board. In turn, the software manager module 222 may detect and identify the modular communication modem. The software manager module 222 may make an identification query that requests the modular communication modem to provide device identification information. Alternatively, the modular communication modem may automatically send corresponding identification information to the software manager module 222 following power up of the modular communication modem. The identification information may include a unique device identifier of the modem, a type classifier of the modem, a model classifier of the modem, data on the manufacturer of the modem, and/or so forth.

In turn, the software manager module 222 may use the identification information of the modular communication modem to load the appropriate software. The loading of the software for the modem may include installing a radio driver, a data adapter, and/or other software components that are used for the operation of the modem. In some instances, the loading of the software for the modem may further include configuring software settings for the proper operation of the modem. In some embodiments, the software manager module 222 may load the software from a software library 224 that is stored in the memory 214 of the UAV network cell 116. In other embodiments, the software manager module 222 may use a previously activated modular communication modem to download the software for the modem from a software library hosted in the core network 104.

Following the installation of the software for the modular communication modem, the activated modem may initiate an authentication request to the UAV communication controller 112. The authentication request may include a modem hardware identifier, one or more modem software identifiers, an identifier of a corresponding UAV network cell on which the modem is installed, and an authentication credential. The authentication credential may be an authentication key, an authentication token, an authentication certificate, or some other authentication credential that identifies the modem as a trusted entity to the UAV communication controller 112. In some embodiments, the authentication request may be secured by the software manager module 222 for transmission to the UAV communication controller 112. For example, the authentication of the modular communication modem may be performed according to the 0Auth2.0 authorization framework. In another example, various encryption and hashing techniques may be used by the software manager module 222 to prevent man-in-the-middle (MITM) attacks on the authentication of the modular communication modem.

The UAV communication controller 112 may register the modular communication modem in a UAV information database following authentication of the modem. The registration information for the modular communication modem may provide service capability data on the modem. For example, the service capability data for the activated communication modem may include the one or more communication standards (e.g., 3G, 4G, 5G or satellite) that are supported by the activated communication modem. Additionally, the registration information may further include the one or more communication frequency bands supported by the activated communication modem, an identifier of the corresponding UAV network cell, and/or so forth.

In some instances, the software manager module 222 may receive remote power up or power down commands from the UAV communication controller 112 for a particular modular communication modem. In turn, the software manager module 222 may direct the particular modem to either enter into a sleep mode in response to a power down command or activate in response to a power up command. The particular modular communication modem may use minimal energy while in the sleep mode, thereby increasing the operational endurance of the UAV network cell 116.

The communication software 218 may further include a band switch module 226. The band switch module 226 may report signal robustness values to the UAV communication controller 112. The signal robustness values may include a signal robustness value for a currently connected ground network cell, as well as additional signal robustness values that are detected by the communication modems 120(1)-120(K) with respect to one or more additional ground network cell or satellite links that are within communication range of the communication modems 120(1)-120(K). The communication modems 120(1)-120(K) may detect signal robustness values for various communication frequency bands, including frequency bands used by the wireless carrier network 102 and other wireless carrier networks. Signal robustness values may be measured in a multitude of ways, such as via signal strength or signal quality. Signal strength may be measured via a received signal strength indicator (RSSI), a reference signal received power (RSRP), a received channel power indicator (RCPI), or other measurements. Signal quality may be measured through an energy to interface ratio (ECIO), a reference signal received quality (RSRQ), a signal to interference-plus-noise ratio (SINR), or other measurements.

Further, the band switch module 226 may report a relay backhaul throughput value of the UAV network cell 116 to the UAV communication controller 112. The relay backhaul throughput value may measure a throughput for a relay backhaul that is established for carrying relay backhaul traffic between the UAV network cell 116 and a ground network cell. The relay backhaul throughput value may be measured in terms of megabits or kilobits per second, or some other standard data rate measurement. The band switch module 226 may send such values via encrypted communication between the UAV network cell 116 and the core network 104.

In turn, the band switch module 226 may be directed by the UAV communication controller 112 to establish communication channels with one or more ground network cells using different modular communication modems, as well as terminate such communication channels. The communication channels are used by the UAV network cell 116 to carry relay backhaul traffic or portions of the relay backhaul traffic between the UAV network cell 116 and the ground network cells of the wireless carrier network 102. The communication channels may be established at different frequency bands that are supported by the various modular communication modems installed on the system board of the communication hardware 208. In this way, the use of multiple modular communication modems may enable the UAV network cell 116 to maintain continuous communication with the core network 104 of the wireless carrier network 102 via parallel communication channels, communication channel scaling, communication channel roaming, or communication channel hopping.

Example UAV Communication Controller Components

Figure 3:
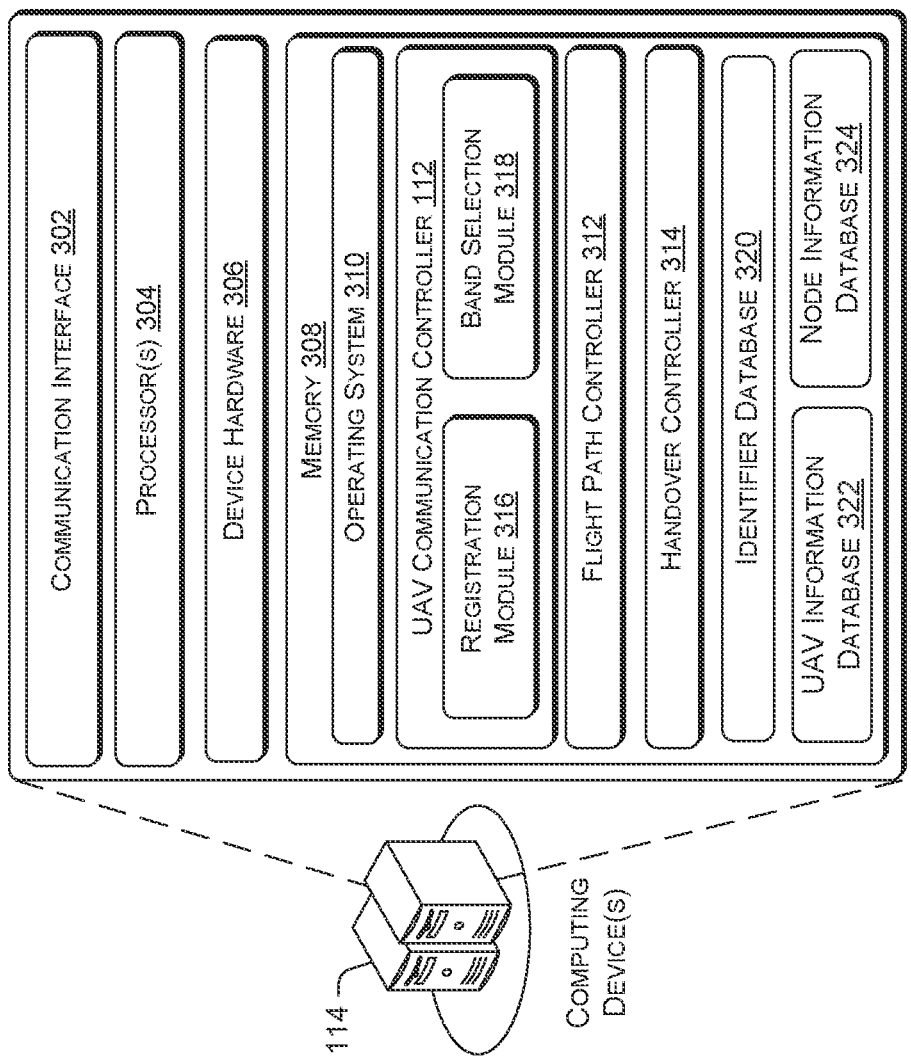
FIG. 3 is a block diagram showing various components of a UAV communication controller that directs a UAV network cell to use multiple UAV communication components to provide wireless communication coverage.

FIG. 3 is a block diagram showing various components of a UAV communication controller 112 that directs a UAV to use multiple UAV communication components to provide wireless communication coverage. The UAV communication controller 112 may be implemented on one or more computing devices 114. The computing devices 114 may be a part of the core network 104. The computing devices 114 may include general purpose computers, servers, or other electronic devices that are capable of receiving inputs, processing the inputs, and generating output data. In other embodiments, the computing devices 114 may be virtual computing devices in the form of virtual machines or software containers that are hosted in a cloud.

The computing devices 114 may include a communication interface 302, one or more processors 304, device hardware 306, and memory 308. The communication interface 302 may include wireless and/or wired communication components that enable the computing devices to transmit data to and receive data from other networked devices via the wireless carrier network 102 and/or an additional network. For example, the additional network may be a local area network (LAN), a larger network such as a wide area network (WAN), or a collection of networks, such as the Internet. The device hardware 306 may include additional hardware that performs user interface, data display, data communication, data storage, and/or other server functions.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 304 and the memory 308 of the computing devices 114 may implement an operating system 310, the UAV communication controller 112, a flight path controller 312, and a handover controller 314. The operating system 310 may include components that enable the computing devices 114 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system. The memory 308 may further contain multiple databases used by the UAV communication controller 112.

The UAV communication controller 112 may include a registration module 316 and a band selection module 318. These modules may include routines, program instructions, objects, and/or data structures that perform particular tasks or implement particular abstract data types. The registration module 316 may receive authentication requests for modular communication modems from UAV network cells, such as the UAV network cell 116. In various embodiments, an authentication request from a particular communication modem may include a modem hardware identifier, one or more modem software identifiers, an identifier of a corresponding UAV network cell on which the modem is installed, and an authentication credential. The authentication credential may be an authentication key, an authentication token, an authentication certificate, or some other authentication credential that identifies the modem as a trusted entity to the UAV communication controller 112. Accordingly, the authentication of a particular modular communication modem by the registration module 316 may include verifying that the modem hardware identifier identifies a modem hardware version that is supported by the core network 104, verifying that one or more modem software identifiers indicate that the modem software are up-to-date, and/or verifying that a UAV network cell identified by the corresponding UAV network cell identifier is an authorized network cell of the wireless carrier network 102. In various embodiments, the UAV communication controller 112 may make such verification by comparing the identifiers to known valid identifiers in an identifier database 320. Further, the authentication credential may be validated by the registration module 316 to verify that the authentication request truly originated from the particular modular communication modem.

Following the authentication of a particular modular communication modem of a UAV network cell, the registration module 316 may register the particular modular communication modem. The registration may include storing an indication that the particular modular communication modem of the UAV network is authorized to communicate with the core network 104. The registration may further include storing the service capability data on the particular modem in a UAV information database 322. For example, the service capability data for the particular modular communication modem may include the one or more communication standards (e.g., 3G, 4G, 5G or satellite) that are supported by the particular modular communication modem. Additionally, the service capability data for the particular modem may further include the one or more communication frequency bands that are supported by the particular modem, an identifier of the corresponding UAV network cell, and/or so forth.

The band selection module 318 may use information from multiple databases to command a UAV network cell to establish and terminate communication channels for carrying the relay backhaul traffic of the UAV network cell. In various embodiments, the multiple databases may include the UAV information database 322 and a node information database 324. The node information database 324 may contain information regarding the communication capabilities of available network cells. The available network cells may include ground network cells that belong to the wireless carrier network 102, as well as ground network cells of other wireless carrier networks that can be roamed on by the UAV network cells of the wireless carrier network 102. In this context, roaming refers to the ability of a UAV network cell to communicate with the core network 104 of the wireless carrier network 102 while connected to a network cell or an alternative communication node that is not operated by the wireless carrier network 102.

The information on the communication capabilities of an available network cell may include identification information of the available network cell, geographical location of the available network cell, communication frequency bands that are supported by the available network cell, and/or other relevant information. Such relevant information for an available network cell may include site classification information, link protection information, frequency polarization information, communication slot prioritization information, port setting information, relay link identification information, wayside (in-band management) information, and/or so forth. In some embodiments, the node information database 324 may further contain information on one or more satellite communication frequency bands that may be roamed on by the UAV network cells of the wireless carrier network 102.

In addition to the information from the multiple databases, the switching algorithms that are applied by the band selection module 318 may further analyze the signal robustness values for relay backhauls that are established by UAV network cells on various communication frequency bands, relay backhaul throughput values of the relay backhauls, and/or so forth. In various embodiments, the band selection module 318 may receive reports of such values via communications with a UAV network cell, such as the UAV network cell 116, as the UAV network cell travels in a geographical area. Such values may be continuously or periodically reported by the UAV network cells to the UAV communication controller 112.

Additionally, the band selection module 318 may receive QoE values of communication sessions that are provided by UAV network cells to user devices. For example, the UAV network cell 116 may provide communication sessions to one or more user devices, such as the user devices 108(1)-108(J). A communication session may enable a user device to obtain communication services from the core network 104 of the wireless carrier network 102. The QoE values may be reported by the one or more user devices to the band selection module 318. A QoE value may represent a number of data packets that are dropped, a number of unintentional audio muting events, a number of voice call drop events, a number of frozen video download events, a number of webpage loading failure events, an audio quality score, a video quality score, and/or so forth, for a particular time period.

Accordingly, in one scenario, a signal robustness value of a communication frequency band that the UAV network cell 116 is using to communicate with a ground network of a wireless carrier network cell may drop below a threshold. In such a scenario, the band selection module 318 may direct the UAV network cell 116 to use another communication modem to establish a new communication channel with the ground network cell or an alternative ground network cell using a different communication frequency band. In this way, the band selection module 318 may keep the UAV network cell in continuous communication with the core network 104 of a wireless carrier network 102.

In another scenario, a QoE value of a communication session that the UAV network cell 116 is carrying for a user device may drop below a threshold due to a lack of a relay backhaul throughput on a first communication frequency band. In such a scenario, the band selection module 318 may direct the UAV network cell 116 to use another communication modem to establish a new communication channel with the ground network cell or an alternative ground network cell using a second communication frequency band. The UAV network cell 116 may use the second communication frequency band to carry one or more communication sessions that are previously carried by the first communication frequency band. Accordingly, the second communication frequency band may be used to either replace the first communication frequency band or supplement the first communication frequency band to increase the relay backhaul throughput for carrying the communication sessions of the user devices. In some instances, the band selection module 318 may use an order of preference when directing a UAV network cell to use an alternative communication frequency band based on the nature of the band. For example, the order of preference may be based on whether the ground network cell associated with the communication frequency band belongs to the wireless carrier network 102 or another wireless carrier network. Further details regarding the operations of the band selection module 318 are illustrated in FIGS. 4-7.

The flight path controller 312 may determine the flight trajectory of a dispatched UAV network cell based on the geolocations of the user devices in a geographical area. The dispatched UAV network cell may be actively providing supplemental network communication coverage to the user devices. In some embodiments, a user device with Global Positioning System (GPS)-capabilities or assisted GPS (A-GPS) capabilities may send its GPS position to a UAV network cell. In turn, the UAV network cell may forward the GPS position to the flight path controller 312. Accordingly, the flight path controller 312 may obtain the geolocations of each user device that is broadcasting its GPS position.

In other embodiments, a user device may measure the signal robustness of communication signals that the user device is receiving from the UAV network cell as the UAV network cell travels along a flight path. The measured signal robustness values are then transmitted by the user device to the UAV network cell. In turn, the UAV network cell may forward the measurements to the flight path controller 312. In this way, the flight path controller 312 may use the multiple signal robustness values provided by each user device to triangulate a geolocation of each user device in a geographical area.

The flight path controller 312 may generate a flight trajectory for the UAV network cell based on the geolocations of user devices in the geographical area. In various embodiments, the flight trajectory may be calculated such that the UAV network cell provides supplemental network coverage to different groups of user devices in the geographical area. The flight path controller 312 may use a best-fit algorithm (e.g., least squares function, chi-square function, etc.) to generate a flight trajectory that fits the UAV network cell within the geolocations of the user devices in the group. However, the computation of the flight trajectory may be constrained such that the UAV network cell always remains within a predetermined range of the ground network cell that is providing the relay backhaul for the UAV network cell. The different groups of user devices may include all the user devices in the geographical area, a largest cluster of user devices in the geographical area, a selected group of one or more user devices, or a specific group of one or more high priority user devices. For example, the specific group may include one or more user devices that have been guaranteed by the wireless communication carrier with communication service that conforms to a particular service level agreement (SLA).

In some embodiments, the flight path controller 312 may further analyze operation condition data related to a geographical area during the calculation of a flight trajectory for the UAV network cell. For example, operation condition data may show natural and/or manmade features in the geographical area that affect the calculation of the flight trajectory for the UAV network cell. These features may include structures that have to be evaded by the UAV network cell, terrain features that may block signal transmission, weather phenomenon that have to be avoided by the UAV network cell, and/or newly implemented governmental flight regulations or flight restrictions that may force the flight path controller 312 to alter the calculated flight trajectory. The flight trajectory may be configured by the flight path controller 312 to evade a structure or terrain feature by causing the UAV to fly around or over the structure or terrain feature. In some instances, the flight path controller 312 may determine that it is unable to generate a flight trajectory that enables the UAV network cell to overfly or bypass a terrain feature or a structure in order to provide network coverage to a group of user devices located in a portion of a geographical area. In such an instance, the flight path controller 312 may dispatch another UAV network cell to reach the group of user devices from a different direction.

The flight path controller 312 may convert a flight trajectory that is calculated for a UAV network cell into control commands for the UAV network cell. In some instances, the flight path controller 312 may further relay manual control commands that are inputted by a user via a user interface to the UAV network cell. In additional embodiments, the flight path controller 312 may also pass on automatic operation commands to the UAV network cell. For example, these commands may cause the UAV network cell to perform automated operations, such as automatically takeoff from a departure point, fly to a particular geographical location, hover at the particular geographical location at a preset altitude, fly in a holding pattern with respect to the particular geographical location, return to and land at a predetermined destination point, and/or so forth.

The handover controller 314 may control the handover of user devices between ground network cells, such as between the base stations 106(1) and 106(2), as well as between a UAV network cell and a ground network cell. Handovers of a user device between network cells may occur as a user device of a user travels over a geographical region. During a handover, a user device that is engaged in an ongoing voice call or data session with the wireless carrier network 102 may be transferred from one network cell or another network cell of the wireless carrier network 102. In other words, the handover controller 314 may direct the user device to terminate an existing wireless communication connection with a first network cell and establish a new wireless communication connection with a second network cell without interrupting the voice call or data session. This transfer of the wireless communication device between the multiple radio cells provided by the network cells may be referred to as a handover. However, a UAV network cell ultimately has to use the wired backhaul of a nearby ground network cell to relay user device communication traffic to the core network 104 of the wireless carrier network 102. Thus, in some circumstances, the handover controller 314 may be configured to disallow the handing over of a user device from a ground network cell to a UAV network cell even when the user device indicates that the user device is getting a more robust communication signal from the UAV network cell.

Example Processes

FIGS. 4-7 present illustrative processes 400-700 for a wireless carrier network to use modular UAV communication components to provide wireless communication coverage. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the environment 100 of FIG. 1.

Figure 4:
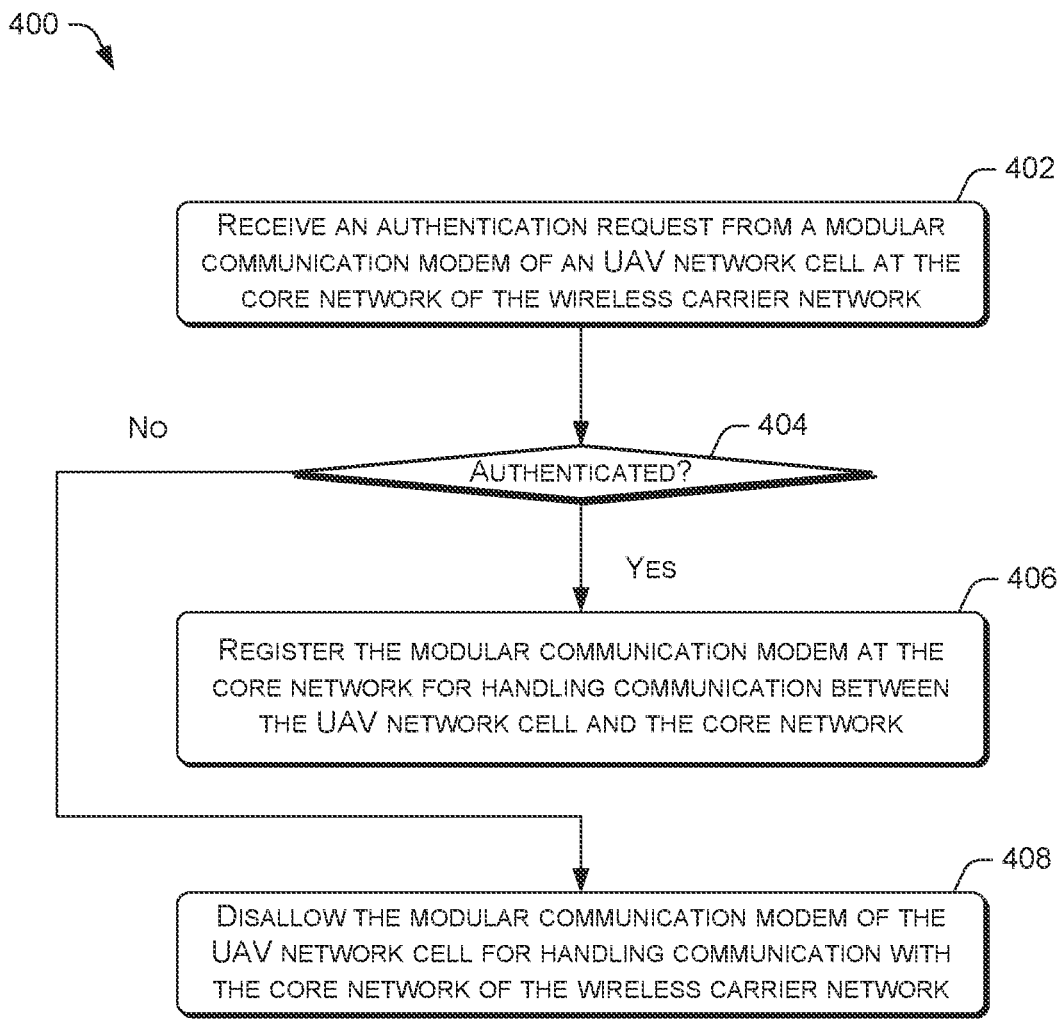
FIG. 4 is a flow diagram of an example process for registering a UAV communication component with a core network of a wireless carrier network.

FIG. 4 is a flow diagram of an example process 400 for registering a UAV communication component with a core network of a wireless carrier network. At block 402, the UAV communication controller 112 at the core network 104 of the wireless carrier network 102 may receive an authentication request from a modular communication modem of the UAV network cell 116. The modular communication modem may send the authentication request following an installation of the modem in the UAV network cell 116 and the loading of the software that enables the modem to perform operations. The modular communication modem may transmit the authentication request to the UAV communication controller 112 via a secure communication. In various embodiments, the authentication request may include a modem hardware identifier, one or more modem software identifiers, an identifier of the UAV network cell 116, and an authentication credential.

At decision block 404, the UAV communication controller 112 may determine whether the modular communication modem that sent the authentication request may be authenticated. In various embodiments, the authentication of the modular communication modem may include verifying that the modem hardware identifier identifies a modem hardware version that is supported by the core network 104, verifying that the modem software identifiers indicate that the modem software is up-to-date, and/or verifying that a UAV network cell identified by the corresponding UAV network cell identifier is an authorized network cell of the wireless carrier network 102. Further, the authentication credential may be validated by the UAV communication controller 112 to verify that the authentication request truly originated from the particular modular communication modem.

Accordingly, if the UAV communication controller 112 determines that the modular communication modem is authenticated ("yes" at decision block 404), the process 400 may proceed to block 406. At block 406, the UAV communication controller 112 may register the modular communication modem at the core network 104 for handling communication between the UAV network cell and the core network 104. The communication may include a relay backhaul between the UAV network cell and a ground network cell that routes the backhaul traffic of the UAV network cell to the core network 104.

In various embodiments, the registration may include storing an indication that the particular modular communication modem of the UAV network is authorized to communicate with the core network 104. The registration may further include storing the service capability data on the modular communication modem in a UAV information database 322. For example, the service capability data for the modular communication modem may include the one or more communication standards (e.g., 3G, 4G, 5G or satellite) that are supported by the modem. Additionally, the service capability data for the modem may further include the one or more communication frequency bands that are supported by the modem, an identifier of the corresponding UAV network cell, and/or so forth.

Returning to decision block 404, if the UAV communication controller 112 determines that the modular communication modem is not authenticated ("no" at decision block 404), the process 400 may proceed to block 408. At block 408, the UAV communication controller 112 may disallow the modular communication modem of the UAV network cell for handling communication with the core network 104 of the wireless carrier network 102.

Figure 5:
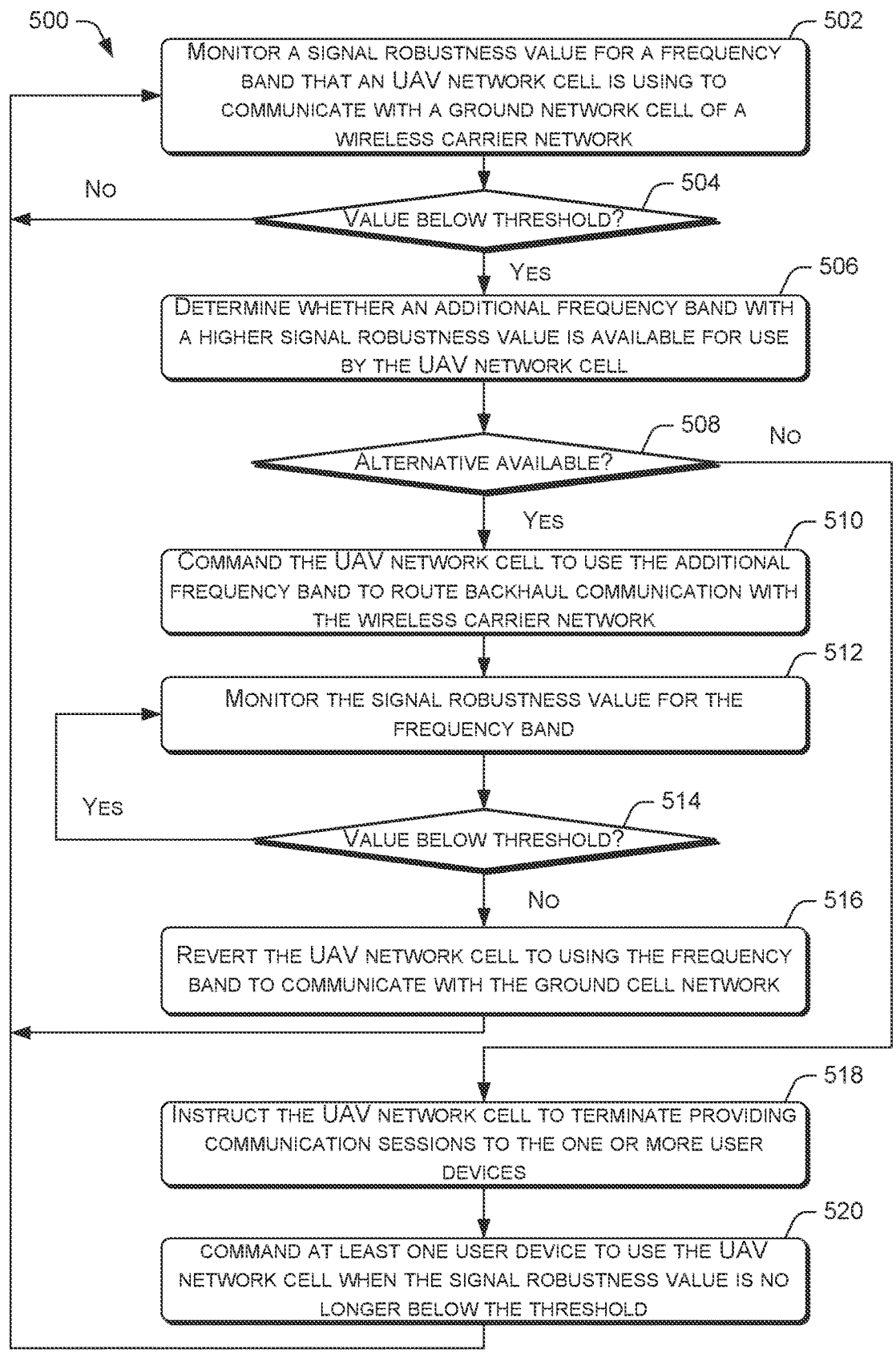
FIG. 5 is a flow diagram of an example process for configuring a UAV network cell to use an alternative communication frequency band to provide network coverage in response to a low signal robustness value.

FIG. 5 is a flow diagram of an example process 500 for configuring a UAV network cell to use a different communication frequency band to provide network coverage in response to a low signal robustness value. At block 502, the UAV communication controller 112 may monitor a signal robustness value for a communication frequency band that the UAV network cell 116 is using to communicate with a ground network cell of the wireless carrier network 102. The communication frequency band may be supported by a modular communication modem of the UAV network cell. The communication frequency band may be used by the UAV network cell 116 to establish a relay backhaul communication channel to carry relay backhaul traffic between the UAV network cell 116 and the ground network cell. In this way, user device communication traffic may be exchanged between the UAV network cell 116 and the core network 104 of the wireless carrier network 102.

At decision block 504, the UAV communication controller 112 may determine whether the signal robustness value has dropped below a predetermined threshold value. Accordingly, if the signal robustness value has not dropped below the predetermined threshold value ("no" at decision block 504), the process 500 may loop back to block 502 so that the UAV communication controller 112 may continue to monitor the signal robustness value. However, if the UAV communication controller 112 determines that the signal robustness value has dropped below the predetermined threshold ("yes" at decision block 504), the process 500 may proceed to block 506.

At block 506, the UAV communication controller 112 may determine whether an additional communication frequency band with a higher signal robustness value is available for use by the UAV network cell 116. The additional communication frequency band may be supported by an additional modular communication modem of the UAV network cell 116. The additional communication frequency band may be different than the communication frequency band. For example, the additional communication frequency band may be in a different frequency range than the communication frequency band. The UAV network cell 116 may use the modular communication modems to continuously or periodically monitor signal robustness values of communication signals on multiple communication frequency bands that are supported by communication modems of the UAV network cell 116. The communication signals may be generated by base stations and/or communication satellites that are capable of carrying relay backhaul traffic for the UAV network cell 116. In turn, the UAV network cell 116 may report such signal robustness values to the UAV communication controller 112. For example, the multiple communication frequency bands may be configured carry communication traffic that conforms to different communication standards, such as 3G, 4G, 5G, and/or satellite.

Thus, at decision block 508, if the UAV communication controller 112 determines that an additional communication frequency band with a higher signal robustness value is available, the process 500 may proceed to block 510. At block 510, the UAV communication controller 112 may command the UAV network cell 116 to use the additional communication frequency band to carry backhaul communication with the wireless carrier network 102. In some embodiments, the additional communication frequency band may be used by the UAV network cell 116 to establish a new communication channel with a ground network cell or a satellite to carry relay backhaul communication instead of the communication channel on the communication frequency band. In such embodiments, the communication channel established using the communication frequency band may be terminated. However, in other embodiments, the additional communication frequency band may be configured by the UAV communication controller 112 to serve a supplemental function by providing a new communication channel that carries the relay backhaul communication in parallel with the communication channel.

At block 512, the UAV communication controller 112 may once again monitor the signal robustness value for the communication frequency band. At decision block 514, the UAV communication controller 112 may determine whether the signal robustness value is still below a predetermined threshold value. Accordingly, if the signal robustness value is still below the predetermined threshold value ("yes" at decision block 514), the process 500 may loop back to block 512 so that the UAV communication controller 112 may continue to monitor the signal robustness value. However, if the UAV communication controller 112 determines that the signal robustness value is no longer below the predetermined threshold ("no" at decision block 514), the process 500 may proceed to block 516.

At block 516, the UAV communication controller 112 may instruct the UAV network cell 116 to terminate using the additional communication frequency band to route communication to the wireless carrier network 102. Accordingly, the UAV network cell 116 may terminate the new communication channel on the additional communication frequency band and revert all relay backhaul communication back to the communication channel on the communication frequency band. In some embodiments, the UAV communication controller 112 may detect such a change in the signal robustness value of the UAV network cell 116 following a modification to a flight path of the UAV network cell 116. Subsequently, the process 500 may loop back to block 502 so that the UAV communication controller 112 may continue to monitor the signal robustness value.

Returning to decision block 508, if the UAV communication controller 112 determines that an additional communication frequency band with a higher signal robustness value is not available, the process 500 may proceed to block 518. At block 518, the UAV communication controller 112 may instruct the UAV network cell 116 to terminate providing communication sessions to the one or more connected user devices that are using the UAV network cell 116 to access communication services provided by the wireless carrier network 102. In some instances, the number of user devices for which communication sessions are terminated may be proportional to an amount of signal robustness value degradation to preserve communication QoE for any remaining connected user devices despite the signal robustness loss. In such instances, there may be at least one remaining connected user device that is still able to access the communication services provided by the wireless carrier network 102 as communication sessions for the one or more connected user devices are terminated until the signal is completely lost. However, in some instances, rather than terminating the communication sessions provided to the one or more connected user devices, the UAV communication controller 112 may transfer the handling of such communication sessions for the one or more connected user devices to another available UAV network cell of the wireless carrier network 102. Such transfer may enable the other UAV network cell to provide communication services to the user devices.

At block 520, the UAV communication controller 112 may command at least one user device to once again use the UAV network cell 116 to communicate with the core network 104 of the wireless carrier network 102 when the signal robustness value is no longer below the predetermined value threshold. The process 500 may loop back to block 502 so that the UAV communication controller 112 may continue to monitor the signal robustness value.

Figure 6:
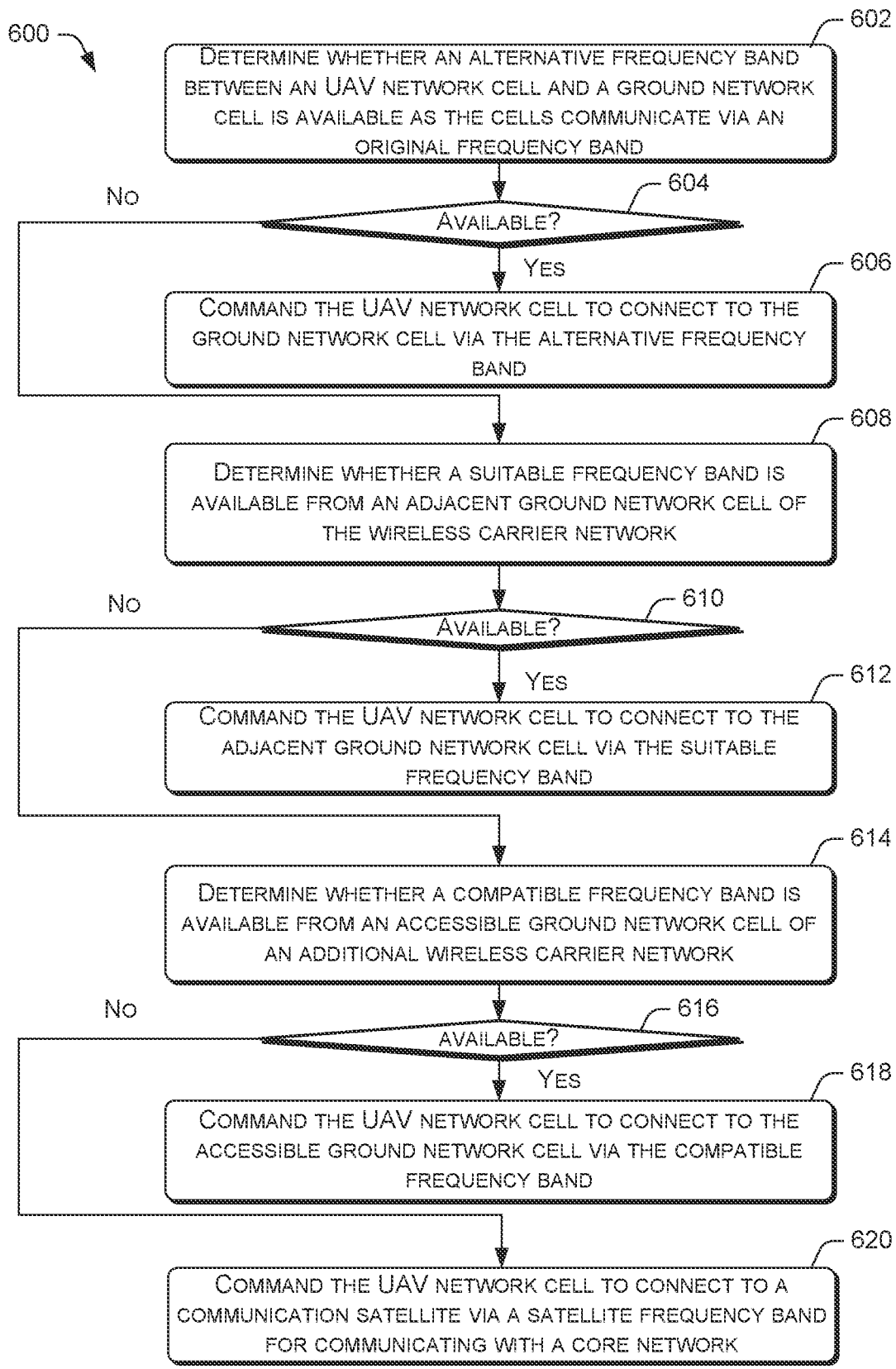
FIG. 6 is a flow diagram of an example process for selecting an alternative communication frequency band for use by a UAV network cell to communicate with a core network of a wireless carrier network.

FIG. 6 is a flow diagram of an example process 600 for selecting an alternative communication frequency band for use by a UAV network cell to communicate with the core network 104 of the wireless carrier network 102. The process 600 may further illustrate operations performed during block 510 of the process 500. Such operations may enable the UAV communication controller 112 to use different available communication frequency bands in an order of preference. The order of preference may be configured to minimize the movement of the UAV network cell 116 and/or minimize roaming cost to the wireless carrier network 102. Further, each of the communication frequency bands described in the process 600 may have a higher signal robustness value than the communication frequency band described in the process 500.

At block 602, the band selection module 318 of the UAV communication controller 112 may determine whether an alternative communication frequency band between the UAV network cell 116 and a ground network cell is available as the cells communicate via an original communication frequency band. The original communication frequency band may be a frequency band for which a signal robustness value has fallen below a predetermined value threshold as described in process 500.

At decision block 604, if the alternative communication frequency band is available for the UAV network cell 116 and the ground network cell ("yes" at decision block 604), the process 600 may proceed to block 606. At block 606, the band selection module 318 may command the UAV network cell 116 to connect to the ground network cell via the alternative communication frequency band.

Returning to decision block 604, if the alternative communication frequency band is not available for the UAV network cell 116 and the ground network cell ("no" at decision block 604), the process 600 may proceed to block 608. At block 608, the UAV communication controller 112 may determine whether a suitable communication frequency band is available from an adjacent ground network cell of the wireless carrier network 102. The suitable communication frequency band may be identical or different from the communication frequency band.

At decision block 610, if the suitable communication frequency band is available from the adjacent ground network cell ("yes" at decision block 610), the process 600 may proceed to block 612. At block 612, the band selection module 318 may command the UAV network cell 116 to connect to the adjacent ground network cell via the suitable communication frequency band.

Returning to decision block 610, if the suitable communication frequency band is not available from an adjacent ground network cell ("no" at decision block 610), the process 600 may proceed to block 614. At block 614, the UAV communication controller 112 may determine whether a compatible communication frequency band is available from an accessible ground network cell of an additional wireless carrier network. The compatible communication frequency band may be different from the communication frequency band.

At decision block 616, if the compatible communication frequency band is available from the accessible ground network cell of the additional wireless carrier network ("yes" at decision block 616), the process 600 may proceed to block 618. At block 618, the band selection module 318 may command the UAV network cell 116 to connect to the accessible ground network cell of the additional wireless carrier network via the compatible communication frequency band. Such a connection via the compatible communication frequency band means that the UAV network cell 116 is effectively roaming on the additional wireless carrier network.

Return to decision block 616, if the compatible communication frequency band is not available from the accessible ground network cell of the additional wireless carrier network ("no" at decision block 616), the process 600 may proceed to block 620. At block 620, the band selection module 318 may command the UAV network cell 116 to connect to a communication satellite that is able to exchange communication with the core network 104 via a satellite frequency band. In some embodiments, the satellite communication connection may be used by the UAV network cell 116 to establish a new communication channel to carry relay backhaul communication instead of the communication channel on the communication frequency band.

Figure 7:
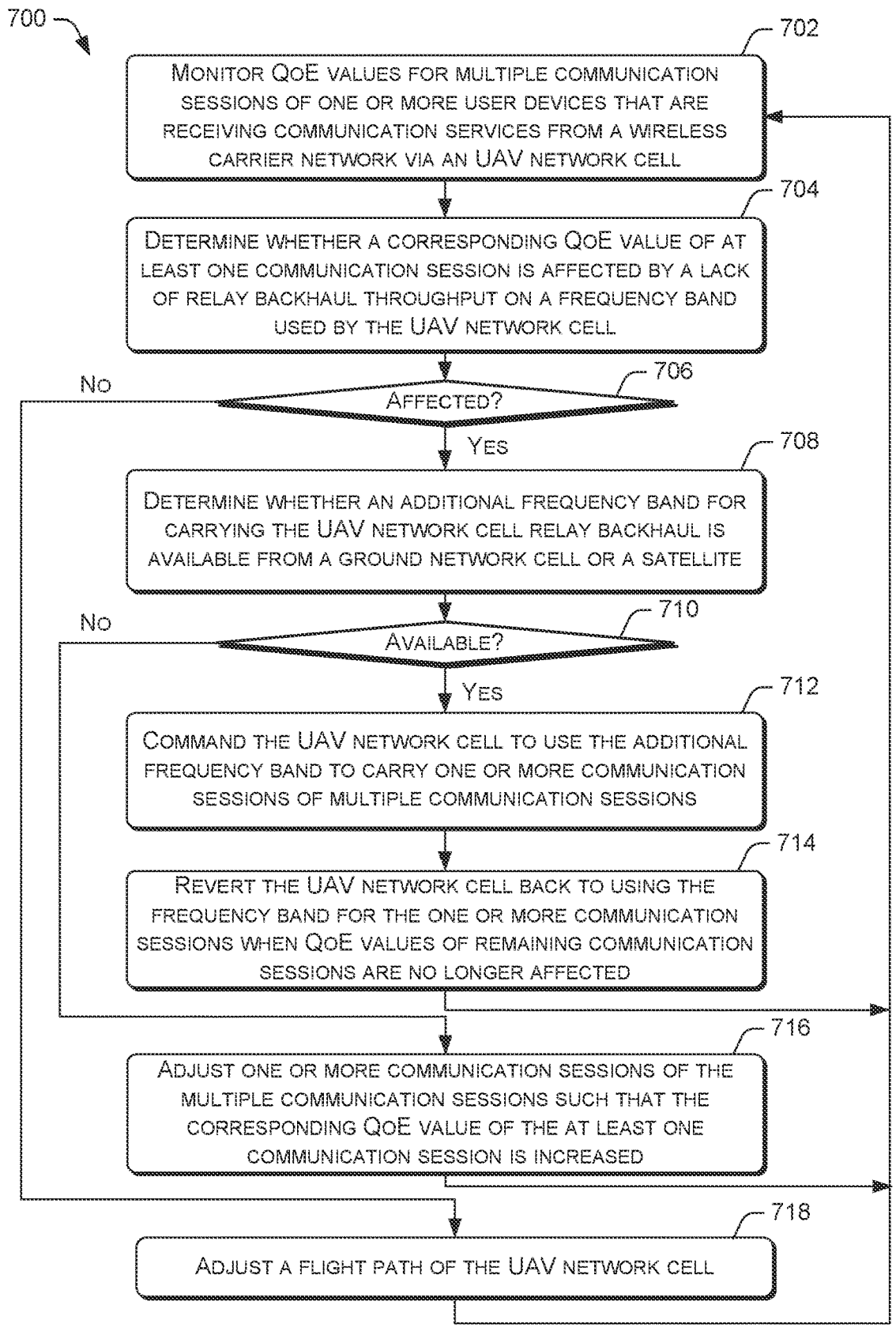
FIG. 7 is a flow diagram of an example process for configuring a UAV network cell to use a different communication frequency band to provide network coverage in response to a lack of UAV network cell throughput on a communication frequency band.

FIG. 7 is a flow diagram of an example process 700 for configuring a UAV network cell to use a different communication frequency band to provide network coverage in response to a lack of UAV network cell throughput on a communication frequency band. At block 702, the UAV communication controller 112 may monitor QoE values for multiple communication sessions of one or more user devices that are receiving communication services from the wireless carrier network 102 via the UAV network cell 116. The QoE values may be reported by the one or more user devices to the UAV communication controller 112.

At block 704, the UAV communication controller 112 may determine whether a corresponding QoE value of at least one communication session of multiple communication sessions is affected by a lack of relay backhaul throughput on a communication frequency band used for a relay backhaul between the UAV network cell 116 and a ground network cell. In some instances, the lack of relay backhaul throughput may be caused by a poor connection between the UAV network cell 116 and the ground network cell that results in a drop in the throughput. In other instances, the lack of relay backhaul throughput may be produced by a number of communication sessions causing high usage demand that exceeds the carrying capacity of the relay backhaul throughput. In some embodiments, the corresponding QoE value may be determined to be affected when the corresponding QoE value is below a predetermined QoE value threshold and the relay backhaul throughput falls below a predetermined throughput threshold value. In other embodiments, the corresponding QoE value may be determined to be affected when the corresponding QoE value is below a predetermined QoE value threshold and a number of communication sessions that are carried by the relay backhaul throughput exceeds a predetermined session quantity threshold.

At decision block 706, if the UAV communication controller 112 determines that the corresponding QoE value of at least one communication session is affected by a lack of UAV network cell relay backhaul throughput ("yes" at decision block 706), the process 700 may proceed to block 708. At block 708, the UAV communication controller 112 may determine whether an additional communication frequency band for carrying the UAV network cell relay backhaul is available from a ground network cell or a satellite. The ground network cell may be the same ground cell that is currently communicating with the UAV network cell 116 via the communication frequency band. Alternatively, the ground network cell may be another ground cell of the wireless carrier network 102, or an accessible ground network cell that belongs to another wireless carrier network 102.

At decision block 710, if the UAV communication controller 112 determines that the additional communication frequency band is available ("yes" at decision block 710), the process 700 may proceed to block 712. At block 712, the UAV communication controller 112 may command the UAV network cell 116 to use the additional communication frequency band to carry one or more of the multiple communication sessions. In some embodiments, the additional communication frequency band may be used by the UAV network cell 116 to establish a new communication channel to carry the multiple communication sessions instead of the communication channel on the communication frequency band. However, in other embodiments, the additional communication frequency band may be configured by the UAV communication controller 112 to serve a supplemental function by providing a new communication channel that carries the multiple communication sessions in parallel with the communication channel. Accordingly, at least one of the multiple communication sessions is offloaded from the communication channel on the communication frequency band to the new communication channel on the additional communication frequency band. In instances where multiple additional communication frequency bands are available, the UAV communication controller 112 may perform a preferential communication frequency band allocation as described with respect to FIG. 6.

At block 714, the UAV communication controller 112 may revert the UAV network cell 116 back to using the communication frequency band for the one or more communication sessions when QoE values of remaining communication sessions carried on the communication frequency band are no longer affected by the lack of UAV network cell relay backhaul throughput. In some instances, this may be because the number of multiple communication sessions dropped sufficiently so that the throughput is no longer overwhelmed. In other instances, this may be because the throughput has increased due to improved connection between the UAV network cell 116 and the ground network cell. Accordingly, the UAV network cell 116 may terminate the new communication channel on the additional communication frequency band. Subsequently, the process 700 may loop back to block 702 so that the UAV communication controller 112 may continue to monitor the QoE values.

Returning to decision block 710, if the UAV communication controller 112 determines that the additional communication frequency band is not available ("no" at decision block 710), the process 700 may proceed to block 716. At block 716, the UAV communication controller 112 may adjust one or more communication sessions of the multiple communication sessions such that the corresponding QoE value of at least one communication session is increased. In some embodiments, the adjustment may involve rebalancing QoE values for the multiple communication sessions. Such rebalancing may involve decreasing the QoE values for a percentage of communication sessions handled by the UAV network cell 116 with the highest QoE values, thereby worsening QoE slightly for these communication sessions while improving QoE values for a set of communication sessions with the lowest QoE values. The decrease of the QoE value for a communication session may be accomplished by reducing the amount of relay backhaul throughput that is allocated for use by the communication session. In other embodiments, the adjustment may involve terminating one or more communication sessions such that QoE values may be improved for the one or more remaining communication sessions that are handled by the UAV network cell 116. In additional embodiments, the adjustment may involve transferring one or more communication sessions to another UAV network cell of the wireless carrier network 102 for handling, such that QoE values may be improved for the one or more remaining communication sessions that are handled by the UAV network cell 116. Subsequently, the process 700 may loop back to block 702 so that the UAV communication controller 112 may continue to monitor the QoE values.

Returning to decision block 706, if the UAV communication controller 112 determines that the corresponding QoE value of at least one communication session is not affected by a lack of UAV network cell relay backhaul throughput ("no" at decision block 706), the process 700 may proceed to block 718. At block 718, the UAV communication controller 112 may prompt the flight path controller 312 to adjust a flight path of the UAV network cell 116. The adjustment of the flight path may improve the corresponding QoE value for at least one communication session. In various embodiments, the adjustment of the flight path may increase the signal robustness of the communication signal received by a user device from the UAV network cell 116, thereby improving the QoE of the communication session used by the user device. Subsequently, the process 700 may loop back to block 702 so that the UAV communication controller 112 may continue to monitor the QoE values.

A UAV network cell that uses modular communication modems may be configured to support various communication standards and communication frequency bands depending on the objectives of the UAV network cell deployment. Accordingly, such a UAV network cell offers flexible communication capabilities and the ability to accept hardware upgrades as future communication standards and technologies are released.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more processors; and
memory having instructions stored therein, the instructions, when executed by the one or more processors, cause the one or more processors to perform acts comprising:
receiving an authentication request from a modular communication modem of a plurality of modular communication modems in an unmanned aerial vehicle (UAV) network cell at a core network of a wireless carrier network following an installation of the modular communication modem into the UAV network cell, wherein the authentication request includes a UAV network cell identifier of the UAV network cell;
in response to authenticating that the modular communication modem is authorized to communicate with the core network, registering the modular communication modem at the core network to handle communication between the UAV network cell and the core network, wherein the authenticating includes authenticating, via a controller of the core network, that the UAV network cell identifier of the UAV network cell belongs to an authorized network cell of the wireless carrier network; and
in response to determining that the modular communication modem is not authorized to communicate with the core network, disallow the modular communication modem from handling communication between the UAV network cell and the core network.

2. The system of claim 1, wherein the authenticating further includes verifying that the authentication request originated from the modular communication modem based at least on an authentication credential included in the authentication request.

3. The system of claim 1, wherein the authenticating further includes at least one of verifying that a modem hardware identifier included in the authentication request identifies a modem hardware version that is supported by the core network, or verifying that one or more modem software identifiers included in the authentication request indicate that modem software is up-to-date.

4. The system of claim 1, wherein the plurality of modular communication modems support at least one of different communication frequency bands or different communication standards, further comprising switching from using a first communication frequency band or communication standard supported by an additional modular communication modem of the plurality of modular communication modems to a secondary communication frequency band or communication standard supported by the modular communication modem to handle the communication.

5. The system of claim 1, wherein the communication includes relay backhaul communication traffic between the UAV network cell and a ground network cell of a wireless communication network, the relaying backhaul communication traffic including one or more communication sessions of user devices that are receiving communication services from the core network of the wireless carrier network.

6. The system of claim 1, wherein the registering includes storing information on one or more communication standards that are supported by the modular communication modem.

7. The system of claim 1, wherein the registering includes storing information on one or more communication frequency bands that are supported by the modular communication modem.

8. One or more non-transitory computer-readable media storing computer-executable instructions that upon execution cause one or more processors to perform acts comprising:
receiving an authentication request from a modular communication modem of a plurality of modular communication modems in an unmanned aerial vehicle (UAV) network cell at a core network of a wireless carrier network following an installation of the modular communication modem into the UAV network cell, wherein the authentication request includes a UAV network cell identifier of the UAV network cell;

in response to authenticating that the modular communication modem is authorized to communicate with the core network, registering the modular communication modem at the core network to handle communication between the UAV network cell and the core network, wherein the authenticating includes authenticating, via a controller of the core network, that the UAV network cell identifier of the UAV network cell belongs to an authorized network cell of the wireless carrier network; and in response to determining that the modular communication modem is not authorized to communicate with the core network, disallow the modular communication modem from handling communication between the UAV network cell and the core network.

9. The one or more non-transitory computer-readable media of claim 8, wherein the authenticating further includes verifying that the authentication request originated from the modular communication modem based at least on an authentication credential included in the authentication request.

10. The one or more non-transitory computer-readable media of claim 8, wherein the authenticating further includes at least one of verifying that a modem hardware identifier included in the authentication request identifies a modem hardware version that is supported by the core network, or verifying that one or more modem software identifiers included in the authentication request indicate that modem software is up-to-date.

11. The one or more non-transitory computer-readable media of claim 8, wherein the plurality of modular communication modems support at least one of different communication frequency bands or different communication standards, further comprising switching from using a first communication frequency band or communication standard supported by an additional modular communication modem of the plurality of modular communication modems to a secondary communication frequency band or communication standard supported by the modular communication modem to handle the communication.

12. The one or more non-transitory computer-readable media of claim 8, wherein the communication includes relay backhaul communication traffic between the UAV network cell and a ground network cell of a wireless communication network, the relaying backhaul communication traffic including one or more communication sessions of user devices that are receiving communication services from the core network of the wireless carrier network.

13. The one or more non-transitory computer-readable media of claim 8, wherein the registering includes storing information on one or more communication standards that are supported by the modular communication modem.

14. The one or more non-transitory computer-readable media of claim 8, wherein the registering includes storing information on one or more communication frequency bands that are supported by the modular communication modem.

15. A computer-implemented method, comprising:
receiving, at one or more computing devices of a core network of a wireless carrier network, an authentication request from a modular communication modem of a plurality of modular communication modems in an unmanned aerial vehicle (UAV) network cell following an installation of the modular communication modem into the UAV network cell, wherein the authentication request includes a UAV network cell identifier of the UAV network cell;

in response to authenticating, at the one or more computing devices, that the modular communication modem is authorized to communicate with the core network, registering the modular communication modem at the core network to handle communication between the UAV network cell and the core network, wherein the authenticating includes authenticating, via a controller of the core network, that the UAV network cell identifier of the UAV network cell belongs to an authorized network cell of the wireless carrier network; and in response to determining, at the one or more computing devices, that the modular communication modem is not authorized to communicate with the core network, disallow the modular communication modem from handling communication between the UAV network cell and the core network.

16. The computer-implemented method of claim 15, wherein the authenticating further includes verifying that the authentication request originated from the modular communication modem based at least on an authentication credential included in the authentication request.

17. The computer-implemented method of claim 15, wherein the authenticating further includes at least one of verifying that a modem hardware identifier included in the authentication request identifies a modem hardware version that is supported by the core network, or verifying that one or more modem software identifiers included in the authentication request indicate that modem software is up-to-date.

18. The computer-implemented method of claim 15, wherein the plurality of modular communication modems support at least one of different communication frequency bands or different communication standards, further comprising switching from using a first communication frequency band or communication standard supported by an additional modular communication modem of the plurality of modular communication modems to a secondary communication frequency band or communication standard supported by the modular communication modem to handle the communication.

19. The computer-implemented method of claim 15, wherein the communication includes relay backhaul communication traffic between the UAV network cell and a ground network cell of a wireless communication network, the relaying backhaul communication traffic including one or more communication sessions of user devices that are receiving communication services from the core network of the wireless carrier network.

20. The computer-implemented method of claim 15, wherein the registering includes storing information on one or more communication standards or one or more communication frequency bands that are supported by the modular communication modem.

* * * * *